(12) United States Patent
Kühne et al.

(10) Patent No.: US 12,037,003 B2
(45) Date of Patent: Jul. 16, 2024

(54) METHOD AND CONTROL DEVICE FOR OPERATING A MOTOR VEHICLE

(71) Applicant: AUDI AG, Ingolstadt (DE)

(72) Inventors: Marcus Kühne, Beilngries (DE); Daniel Profendiner, Ingolstadt (DE); Nils Wollny, Munich (DE)

(73) Assignee: AUDI AG, Ingolstadt (DE)

( * ) Notice: Subject to any disclaimer, the term of this patent is extended or adjusted under 35 U.S.C. 154(b) by 302 days.

(21) Appl. No.: 17/051,646

(22) PCT Filed: Sep. 7, 2018

(86) PCT No.: PCT/EP2018/074171
§ 371 (c)(1),
(2) Date: Oct. 29, 2020

(87) PCT Pub. No.: WO2019/210986
PCT Pub. Date: Nov. 7, 2019

(65) Prior Publication Data
US 2021/0188298 A1  Jun. 24, 2021

(30) Foreign Application Priority Data
Apr. 30, 2018  (DE) .................... 10 2018 206 657.4

(51) Int. Cl.
*B60W 50/10*  (2012.01)
*B60W 40/09*  (2012.01)
(Continued)

(52) U.S. Cl.
CPC ............ *B60W 50/10* (2013.01); *B60W 40/09* (2013.01); *B60W 60/001* (2020.02);
(Continued)

(58) Field of Classification Search
CPC .... B60W 50/10; B60W 40/09; B60W 60/001; B60W 2552/30; B60W 2720/106;
(Continued)

(56) References Cited

U.S. PATENT DOCUMENTS 9,922,466 B2    3/2018  Donnelly et al.
2002/0021407 A1 2/2002  Elliott
(Continued)

FOREIGN PATENT DOCUMENTS

DE  10 2009 060 213 A1   6/2011
DE  20 2012 009 352 U1   1/2013
(Continued)

OTHER PUBLICATIONS

Herb, Frieder, Jan. 2015, Espacenet.com, DE102014011278A1 English Translation, p. 1-5 (Year: 2015).*
(Continued)

*Primary Examiner* — Aniss Chad
*Assistant Examiner* — Jennifer M Anda
(74) *Attorney, Agent, or Firm* — STAAS & HALSEY LLP

(57) ABSTRACT

While a motor vehicle is travelling, a selected offer of entertainment for a vehicle occupant is output by use of a display device arranged in the motor vehicle. Driving characteristics of the motor vehicle are adapted by a control device of the motor vehicle to the offer of entertainment output at a given moment and the motor vehicle is autonomously controlled in a way corresponding to the adapted driving characteristics.

12 Claims, 1 Drawing Sheet

(51) Int. Cl.
*B60W 60/00* (2020.01)
*G06T 19/00* (2011.01)

(52) U.S. Cl.
CPC ....... *G06T 19/006* (2013.01); *B60W 2552/30* (2020.02); *B60W 2720/106* (2013.01)

(58) Field of Classification Search
CPC ....... B60W 60/00136; B60W 2552/20; B60W 50/0098; A63F 13/65; A63F 13/28; A63F 13/803; B60K 2370/164; B60K 2370/175; G06T 19/006
See application file for complete search history.

(56) References Cited

U.S. PATENT DOCUMENTS

| | | | |
|---|---|---|---|
| 2015/0269780 A1 | 9/2015 | Herman et al. | |
| 2016/0251016 A1* | 9/2016 | Pallett et al. | B60W 50/00 |
| 2017/0078638 A1* | 3/2017 | Alaniz et al. | H04N 13/0014 |
| 2017/0102700 A1* | 4/2017 | Kozak | B60W 30/00 |
| 2017/0236328 A1* | 8/2017 | Eatedali | G01C 21/3688 345/633 |
| 2017/0352185 A1* | 12/2017 | Bonilla Acevedo | B60J 1/20 |
| 2018/0040163 A1* | 2/2018 | Donnelly | G06F 3/011 |
| 2018/0089900 A1 | 3/2018 | Rober et al. | |
| 2018/0089901 A1* | 3/2018 | Rober | G06F 3/016 |
| 2018/0111623 A1* | 4/2018 | Augst | B60W 40/06 |
| 2018/0270542 A1* | 9/2018 | Ramalingam | H04N 21/25841 |
| 2020/0320788 A1* | 10/2020 | Kühne | G06F 3/04815 |
| 2021/0188088 A1* | 6/2021 | Kuehne | B60K 15/00 |

FOREIGN PATENT DOCUMENTS

| | | | | |
|---|---|---|---|---|
| DE | 10 2012 215 397 A1 | 3/2014 | | |
| DE | 10 2014 011 278 A1 | 1/2015 | | |
| DE | 102014011278 A1 * | 1/2015 | ............ B60R 16/02 |
| DE | 10 2015 013 319 A1 | 4/2017 | | |
| DE | 10 2016 000 686 A1 | 7/2017 | | |

OTHER PUBLICATIONS

International Search Report (Forms PCT/ISA/210, PCT/ISA/220) dated Jan. 22, 2019, in International Patent Application No. PCT/EP2018/074171.
Written Opinion of the International Searching Authority dated Jan. 22, 2019, in International Patent Application No. PCT/EP2018/074171.
International Preliminary Report on Patentability (Forms PCT/IPEA/409, PCT/IPEA/416) dated Aug. 10, 2020, in International Patent Application No. PCT/EP2018/074171.
Examination Report dated Jan. 16, 2019, in German Patent Application No. 10 2018 206 657.4.
PCT/EP2018/074171, Sep. 7, 2018, Marcus Kühne, Audi AG.
10 2018 206 657.4, Apr. 30, 2018, Marcus Kühne, Audi AG.
International Preliminary Report on Patentability dated Aug. 10, 2020, in International Patent Application No. PCT/EP2018/074171, including English language translation (14 pages total).
Chinese Office Action issued in Chinese Application No. 201880092835.0 dated Dec. 25, 2023.

* cited by examiner

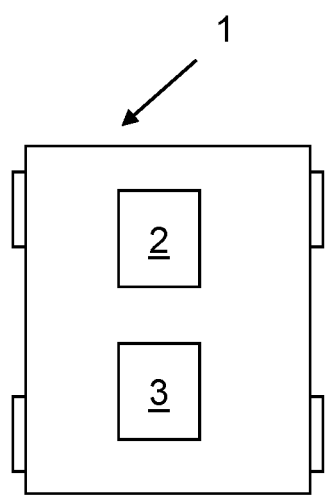

METHOD AND CONTROL DEVICE FOR OPERATING A MOTOR VEHICLE

CROSS REFERENCE TO RELATED APPLICATIONS

This application is a U.S. national stage of International Application No. PCT/EP2018/074171, filed on Sep. 7, 2018. The International Application claims the priority benefit of German Application No. 10 2018 206 657.4 filed on Apr. 30, 2018. Both the International Application and the German Application are incorporated by reference herein in their entirety.

BACKGROUND

Described herein is a method for operating a motor vehicle. Furthermore, described herein is a control device for operating a motor vehicle and also a motor vehicle with such a control device.

Suggestions have already been made for ways in which numerous new entertainment formats that are directly influenced by the route being traveled can be offered in motor vehicles. Thus, for example, German Patent Application No. 10 2015 013 319 A1 describes a method for operating a motor vehicle in which a game can be played in the motor vehicle while the motor vehicle is being autonomously driven, with the experience of the game being adapted to a situation applicable at the time of traveling.

German Patent Application No. 20 2012 009 352 U1 describes a games device for a virtual racing game. The virtual track within the virtual racing game is in this case adapted by an actual situation applicable while traveling in a motor vehicle.

German Patent Application No. 10 2009 060 213 A1 describes a method for operating a motor vehicle as a driving simulator. Dynamic parameters prevailing during the driving simulation are determined, with at least one active vehicle system, for example a chassis system, a steering wheel, a pedal system, an active damper or the like, being activated while taking into account the dynamic parameter.

SUMMARY

One or more aspects of the disclosure include providing a solution by which offers of entertainment can be provided in a particularly realistic way while traveling in a motor vehicle.

This may be achieved by a method and by a control device for operating a motor vehicle with features as described herein. Advantageous refinements with expedient and non-trivial developments are further described herein.

In the case of the method described herein for operating a motor vehicle, while traveling in the motor vehicle, a selected offer of entertainment for a vehicle occupant is output by use of a display device arranged in the motor vehicle. The method described herein is in this case distinguished by the fact that driving characteristics of the motor vehicle are adapted to the offer of entertainment output at a given moment and the motor vehicle is autonomously controlled in a way corresponding to the adapted driving characteristics.

One or more aspects of the disclosure are based on the finding that an, in particular visually perceptible, offer of entertainment that is output by use of the display device arranged in the motor vehicle is influenced very greatly for the consumer of the offer of entertainment. That is to say the vehicle occupant is concerned with regard to a particularly realistic impression that is affected not only by visual stimuli provided by the display device but also by how the vehicle occupant perceives his or her actual environment. The better the output offer of entertainment can be harmonized with the driving characteristics of the motor vehicle, the more realistic the offer of entertainment output by use of the display device feels for the vehicle occupant.

Therefore, it is envisaged according to the disclosure to adapt the driving characteristics of the motor vehicle to the offer of entertainment output at a given moment and to control the motor vehicle autonomously in a way corresponding to the adapted driving characteristics. It goes without saying that the driving characteristics of the motor vehicle are only adapted to the offer of entertainment output at a given moment within the limits of acceptable parameters, with regard to legal regulations and a respective traffic situation in which the motor vehicle finds itself at the time.

If the offer of entertainment is for example a virtual experience, the vehicle occupant is possibly visually shut off completely from the actual environment. If for example the vehicle occupant is flying over the surface of a virtual planet and the motor vehicle goes around a bend, this movement also takes place in the virtual world, so that the forces acting on the body coincide with the those experienced virtually. Thus, for example, a virtual space battle involving a journey featuring a lot of accelerations or decelerations and a lot of lane changes is of course more exciting and immersive than when the same movements of a vehicle are seen when watching a movie, which in the latter case would have more of a tendency to be disturbing. The fact that the driving characteristics of the motor vehicle are adapted to the offer of entertainment output at a given moment and the motor vehicle is autonomously controlled in a way corresponding to the adapted driving characteristics means that the offer of entertainment is perceived particularly realistically by the vehicle occupant, since in particular the accelerations and movements that the vehicle occupant experiences in reality as a result of the driving characteristics of the motor vehicle match very well the offer of entertainment played.

An advantageous embodiment of the disclosure provides that the driving characteristics of the motor vehicle are adapted to a virtual movement of the vehicle occupant within a virtual environment of the offer of entertainment output at a given moment. If for example the vehicle occupant moves highly dynamically within the virtual environment, for example quickly sideways with relatively great acceleration, the driving characteristics of the motor vehicle are adapted correspondingly, so that it itself exhibits particularly dynamic driving characteristics, for example when making required lane changes. If the vehicle occupant moves particularly slowly or leisurely within the virtual movement, the driving characteristics of the motor vehicle are likewise adapted correspondingly, as a result of which the motor vehicle is autonomously controlled particularly leisurely. By adapting the motor vehicle to a respective virtual movement of the vehicle occupant within the virtual environment reproduced, it can be perceived with a particularly realistic impression.

A further advantageous embodiment of the disclosure provides that the display device takes the form of virtual reality glasses, augmented reality glasses, or mixed reality glasses, by use of which the selected offer of entertainment is output. In the case of virtual reality glasses, the vehicle occupant can therefore visually immerse himself or herself completely in the virtual environment displayed by use of the virtual reality glasses. The vehicle occupant is in this case therefore shut off completely by the virtual reality glasses as far as his or her perception of visual stimuli is concerned. This allows a particularly immersive experience to be obtained, in particular because the driving characteristics of the motor vehicle are adapted to the contents displayed by use of the virtual reality glasses. In the case of augmented reality glasses, the vehicle occupant can still see at least parts of his or her actual environment, with the augmented reality glasses superposing or overlaying for example information concerning actual objects. Also in this case, it may be very useful to adapt the driving characteristics of the motor vehicle correspondingly to contents displayed by use of the augmented reality glasses, in order to allow an impression that is as realistic as possible. The same also applies to mixed reality glasses.

In a further advantageous refinement of the disclosure, it is provided that longitudinal acceleration characteristics of the motor vehicle are adapted to the offer of entertainment output at a given moment. If the offer of entertainment output at a given moment provides for example that the vehicle occupant is virtually accelerated and decelerated relatively quickly in the longitudinal direction, the driving characteristics of the motor vehicle are adapted correspondingly, as a result of which the offer of entertainment is perceived as particularly realistic.

According to a further advantageous embodiment of the disclosure, it is provided that the transverse acceleration characteristics of the motor vehicle are adapted to the offer of entertainment output at a given moment. If the vehicle occupant moves for example relatively quickly and jerkily to the left and right within a displayed virtual reality, the transverse acceleration characteristics of the motor vehicle are likewise made correspondingly dynamic. If the vehicle occupant moves within a displayed virtual environment that is part of the offer of entertainment, for example relatively leisurely or a little to the left and right, the transverse acceleration characteristics of the motor vehicle can likewise be adapted correspondingly, in order to allow a perception of the offer of entertainment while traveling in the motor vehicle that has a particularly realistic impression.

A further advantageous embodiment of the disclosure provides that the overtaking characteristics of the motor vehicle are adapted to the offer of entertainment output at a given moment. The example already mentioned previously, with the virtual space battle, can in that case be taken into account for example such that the driving characteristics are adapted in such a way that relatively dynamic overtaking maneuvers are performed by the motor vehicle whenever possible without any problem—of course within the limits of what is legally and safely acceptable—in order that the acceleration characteristics of the motor vehicle actually felt are adapted to the virtual space battle. If for example the output offer of entertainment at the time is a movie, it may be provided by contrast that the motor vehicle overtakes as little as possible or only very smoothly, in order not to disturb the experience of the film.

In a further advantageous refinement of the disclosure, it is provided that, should there be several routes to a destination, the one of the routes that best matches the selected offer of entertainment is chosen. If there is therefore a choice between several ways of reaching a destination, the one that best matches the offer of entertainment to be output at the time is chosen. If for example the vehicle occupant would like to watch a film in a virtual cinema, a smoother route with many straight sections is chosen, in order for example to avoid nausea when watching the film. If by contrast the vehicle occupant would for example like to experience a virtual space battle or an exciting rollercoaster ride, a route with a particularly great number of curves, possibly also with many ups and downs, is chosen. For example, a respective height profile and/or curve profile of the route is therefore taken into account in the selection. So if there are more routes to the destination, selecting precisely the route that best matches the selected offer of entertainment can help to ensure that the offer of entertainment is perceived as particularly realistic by all senses.

The control device described herein for operating a motor vehicle is designed to adapt driving characteristics of the motor vehicle to an offer of entertainment output by use of a display device arranged in the motor vehicle and to control the motor vehicle autonomously in a way corresponding to the adapted driving characteristics. Advantageous refinements of the method described herein can be regarded as advantageous refinements of the control device described herein, and vice versa, with the control device having features for carrying out the method operations.

The motor vehicle described herein includes the control device described herein or an advantageous embodiment of the control device described herein.

Further advantages, features and details of the disclosure will become apparent from the following description of example embodiments and with reference to the single drawing. The features and feature combinations mentioned above in the description and also the features and feature combinations shown below in the description of the single drawing and/or in the single drawing alone are usable not only in the combination respectively indicated, but also in other combinations or by themselves, without departing from the scope of the disclosure.

BRIEF DESCRIPTION OF THE DRAWINGS

These and other aspects and advantages will become more apparent and more readily appreciated from the following description of the example embodiments, taken in conjunction with the accompanying single drawing which is a schematic representation of a motor vehicle, which has a control device for autonomously controlling the motor vehicle, there being arranged within the motor vehicle a display device by use of which different offers of entertainment when traveling in the motor vehicle can be output.

DETAILED DESCRIPTION

Reference will now be made in detail to examples which are illustrated in the accompanying single drawing, wherein like reference numerals refer to like elements throughout.

A motor vehicle 1 is shown in a highly schematized form in the single drawing. The motor vehicle 1 includes a control device 2 (for example, having a memory storing instructions and a processor to execute the instructions) for operating the motor vehicle 1. The control device 2 is designed to adapt driving characteristics of the motor vehicle 1 to an offer of entertainment output by use of a display device 3 arranged in the motor vehicle 1 and to control the motor vehicle 1 autonomously in a way corresponding to the adapted driving characteristics.

While traveling in a motor vehicle 1, an offer of entertainment selected by a vehicle occupant not represented here is therefore output by use of the display device 3 arranged in the motor vehicle 1. The display device 3 may be for example virtual reality glasses, augmented reality glasses, or else mixed reality glasses. Moreover, it is also possible that the display device 3 is for example a display device fixed to the vehicle, such as for example a display unit or the like.

The driving characteristics of the motor vehicle 1 are adapted to the offer of entertainment output at a given moment, with the motor vehicle 1 being autonomously controlled by use of the control device 2 in a way corresponding to the adapted driving characteristics. Thus, it is for example provided that the driving characteristics of the motor vehicle 1 are adapted to a virtual movement of the vehicle occupant within a virtual environment of the offer of entertainment output at a given moment.

If for example the vehicle occupant is wearing virtual reality glasses in the form of the display device 3, it is possible by use of these glasses to output for example a virtual space battle, in which the vehicle occupant virtually moves relatively dynamically up and down and also back and forth sideways within a virtual environment. Moreover, it may also be envisaged that it is provided within the limits of the virtual space battle that relatively rapid or strong acceleration processes and deceleration processes occur within the virtual environment.

It may thus be provided that the longitudinal acceleration characteristics and the transverse acceleration characteristics of the motor vehicle 1 are adapted to the offer of entertainment output at a given moment, in the specific case therefore to the virtual space battle. Also, overtaking characteristics of the motor vehicle 1 may be adapted to the offer of entertainment output at a given moment. If for example, on the basis of his or her visual perception within the virtual space battle, the vehicle occupant performs many evasive maneuvers, the overtaking characteristics of the motor vehicle 1 may take place correspondingly dynamically—to the extent that is legally admissible and also safe in view of the traffic situation.

If on the other hand it is provided by use of the display device 3 arranged in the motor vehicle 1 that the vehicle occupant is for example transported into a kind of virtual cinema in order to watch a film, the driving characteristics of the motor vehicle 1 may be made particularly smooth. As a result, it can for example be ensured that the vehicle occupant does not become nauseous when watching the film.

Moreover, it may also be provided that, should there be several routes to a destination, the one of the routes that best matches the selected offer of entertainment is chosen. For example, a respective height profile and/or curve profile of the routes may be taken into account in the selection. Thus, it is possible for example that the motor vehicle 1 has a built-in navigation system, which provides corresponding information on the height profile and/or curve profile of various alternative routes to a destination. Depending on what kind of offer of entertainment the vehicle occupant has selected, the one of the routes that best matches the selected offer of entertainment can be selected, in particular with regard to the virtual movement of the vehicle occupant within a virtual environment of the offer of entertainment output at a given moment.

By use of the control device 2 and the method explained, it is therefore possible to adapt the driving characteristics of the motor vehicle 1 to a respective offer of entertainment that is played by use of the display device 3 arranged in a motor vehicle 1. In the context, it may for example also be provided that the offer of entertainment as such is likewise adapted to respective driving dynamics of the motor vehicle 1 with regard to a virtual movement of the vehicle occupant within a virtual environment of the offer of entertainment output at a given moment. Thus, it is possible to adapt not only the driving characteristics of the motor vehicle to the offer of entertainment output at a given moment but also to adapt the offer of entertainment to respective driving characteristics of the motor vehicle 1. This allows a particularly realistic perception of the offer of entertainment output at a specific time while traveling in the motor vehicle 1.

A description has been provided with reference to various examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method of operating a motor vehicle, the method comprising:
    outputting by a display device arranged in the motor vehicle, a virtual environment of a selected offer of entertainment for an occupant of the motor vehicle;
    providing information on respective height profiles and curve profiles of a plurality of routes to a destination from a navigation system for the motor vehicle to a control device;
    selecting, by the control device, a route from among the plurality of routes based on the provided information, as a best match with the virtual environment of the selected offer of entertainment, based on the respective height profiles and curve profiles, so that driving characteristics of the motor vehicle are adaptable to the selected offer of entertainment output at a given moment and a virtual movement of the occupant within the virtual environment of the selected offer of entertainment output at the given moment, based on a height profile and a curve profile of the route from the navigation system selected as the best match;
    adapting the driving characteristics of the motor vehicle to the virtual movement of the occupant within the virtual environment, based on adapting an overtaking characteristic and/or a lane change characteristic of the motor vehicle to the virtual movement of the occupant within the virtual environment; and
    autonomously controlling the motor vehicle in a way corresponding to the adapted driving characteristics.

2. The method according to claim 1, wherein the display device is virtual reality glasses, augmented reality glasses, or mixed reality glasses.

3. The method according to claim 1, wherein adapting the driving characteristics of the motor vehicle includes adapting longitudinal acceleration characteristics of the motor vehicle to the selected offer of entertainment output at the given moment.

4. The method according to claim 1, wherein adapting the driving characteristics of the motor vehicle includes adapting transverse acceleration characteristics of the motor vehicle to the selected offer of entertainment output at the given moment.

5. A control device for operating a motor vehicle, the control device comprising:
    a memory configured to store instructions; and
    a processor configured to execute the instructions to:
        receive information on respective height profiles and curve profiles of a plurality of routes to a destination from a navigation system for the motor vehicle,
        select a route from among the plurality of routes based on the received information, as a best match with a virtual environment of a selected offer of entertainment for an occupant of the motor vehicle to be output by a display device arranged in the motor vehicle, based on the respective height profiles and curve profiles, so that driving characteristics of the motor vehicle are adaptable to the selected offer of entertainment output at a given moment and a virtual movement of the occupant within the virtual environment of the selected offer of entertainment output at the given moment, based on a height profile and a curve profile of the route from the navigation system selected as the best match;

adapt the driving characteristics of the motor vehicle to the virtual movement of the occupant within the virtual environment, based on adapting an overtaking characteristic and/or a lane change characteristic of the motor vehicle to the virtual movement of the occupant within the virtual environment; and autonomously control the motor vehicle in a way corresponding to the adapted driving characteristics.

6. The control device of claim 5, wherein the display device is virtual reality glasses, augmented reality glasses, or mixed reality glasses.

7. The control device of claim 5, wherein the processor is configured to adapt the driving characteristics of the motor vehicle by adapting longitudinal acceleration characteristics of the motor vehicle to the selected offer of entertainment output at the given moment.

8. The control device of claim 5, wherein the processor is configured to adapt the driving characteristics of the motor vehicle by adapting transverse acceleration characteristics of the motor vehicle to the selected offer of entertainment output at the given moment.

9. A motor vehicle, comprising:
a vehicle body;
a control device; and
a navigation system for the motor vehicle configured to provide, to the control device, information of respective height profiles and curve profiles of a plurality of routes to a destination, wherein the control device is configured to:
select a route from the navigation system from among the plurality of routes based on the provided information, as a best match with a virtual environment of a selected offer of entertainment for an occupant of the motor vehicle to be output by a display device arranged in the motor vehicle, based on the respective height profiles and curve profiles, so that driving characteristics of the motor vehicle are adaptable to the selected offer of entertainment output at a given moment and a virtual movement of the occupant within the virtual environment of the selected offer of entertainment output at the given moment, based on a height profile and a curve profile of the route selected as the best match;

adapt the driving characteristics of the motor vehicle to the virtual movement of the occupant within the virtual environment, based on adapting an overtaking characteristic and/or a lane change characteristic of the motor vehicle to the virtual movement of the occupant within the virtual environment; and autonomously control the motor vehicle in a way corresponding to the adapted driving characteristics.

10. The motor vehicle of claim 9, wherein the display device is virtual reality glasses, augmented reality glasses, or mixed reality glasses.

11. The motor vehicle of claim 9, wherein the control device is configured to adapt the driving characteristics of the motor vehicle by adapting longitudinal acceleration characteristics of the motor vehicle to the selected offer of entertainment output at the given moment.

12. The motor vehicle of claim 9, wherein the control device is configured to adapt the driving characteristics of the motor vehicle by adapting transverse acceleration characteristics of the motor vehicle to the selected offer of entertainment output at the given moment.

* * * * *